March 16, 1948.  B. W. ROTH  2,437,790

ELECTRIC CIRCUIT CONTROLLER

Filed July 27, 1944  7 Sheets-Sheet 1

INVENTOR.
BY Bert W. Roth
Duell, Kane and Smoot
ATTORNEYS

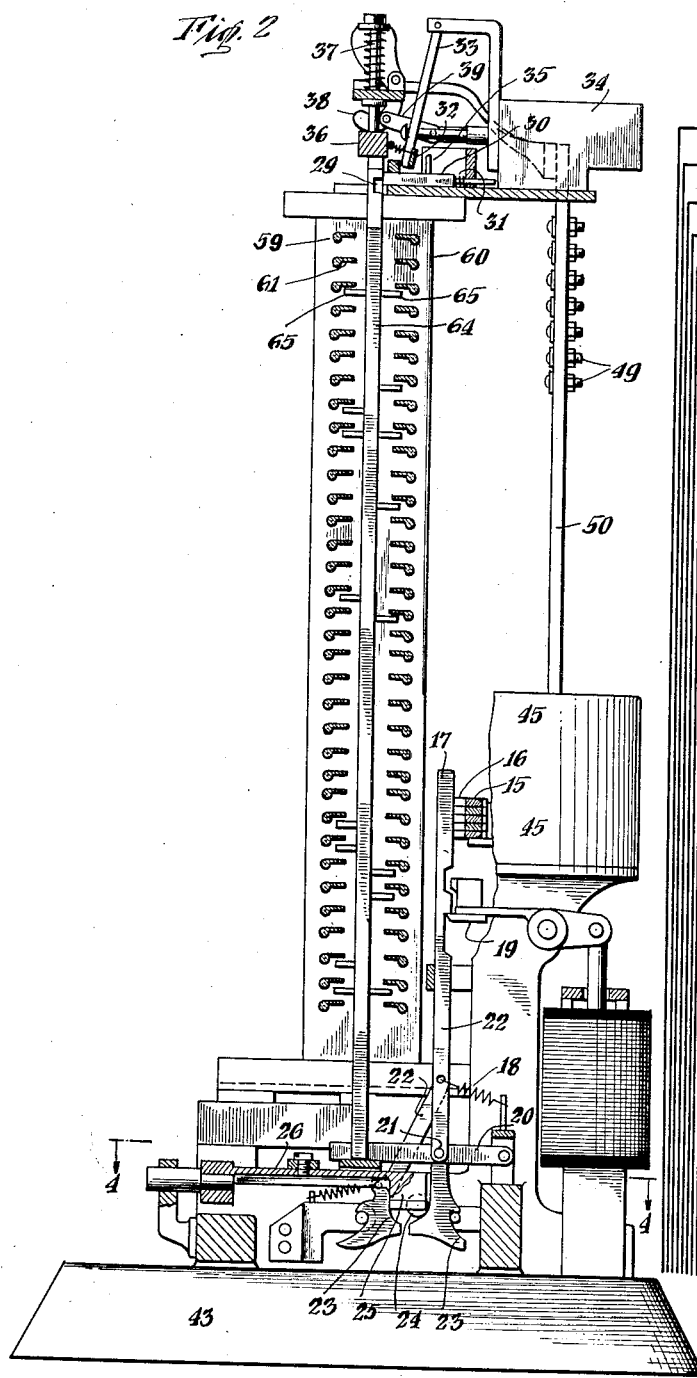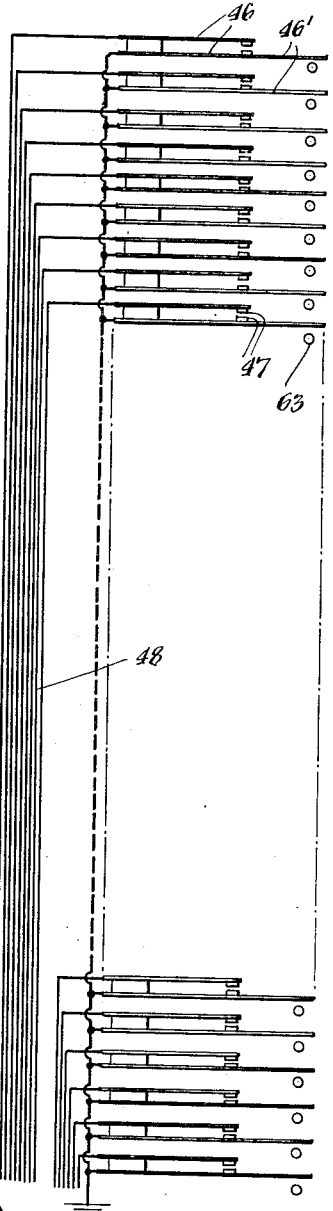

March 16, 1948.　　　　B. W. ROTH　　　　2,437,790
ELECTRIC CIRCUIT CONTROLLER
Filed July 27, 1944　　　　7 Sheets-Sheet 3

INVENTOR.
Bert W. Roth
BY
Duell, Kane and Smoot
ATTORNEYS

March 16, 1948. B. W. ROTH 2,437,790
ELECTRIC CIRCUIT CONTROLLER
Filed July 27, 1944 7 Sheets-Sheet 4

INVENTOR.
Bert W. Roth
BY
Duell, Kane and Smoot
ATTORNEYS

March 16, 1948.　　　　B. W. ROTH　　　　2,437,790
ELECTRIC CIRCUIT CONTROLLER
Filed July 27, 1944　　　　7 Sheets-Sheet 5

INVENTOR.
Bert W. Roth
BY
Duell, Kane and Smoot
ATTORNEYS

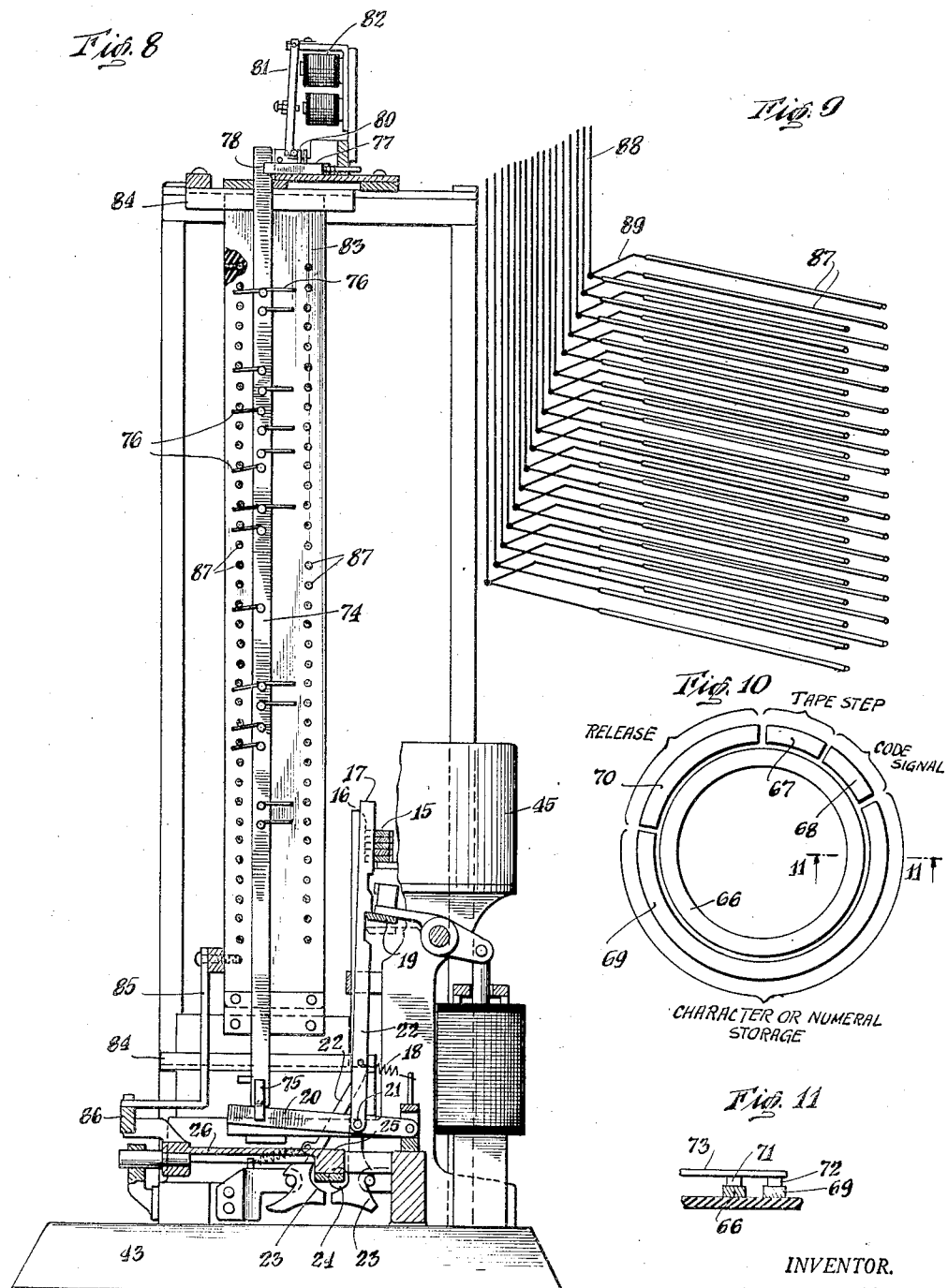

March 16, 1948. B. W. ROTH 2,437,790
ELECTRIC CIRCUIT CONTROLLER
Filed July 27, 1944 7 Sheets-Sheet 7

INVENTOR.
Bert W. Roth
BY Duell, Kane and Smoot
ATTORNEYS

Patented Mar. 16, 1948

2,437,790

UNITED STATES PATENT OFFICE 2,437,790

ELECTRIC CIRCUIT CONTROLLER

Bert W. Roth, Riverdale, N. Y., assignor to Trans-Lux Corporation, New York, N. Y., a corporation of Delaware Application July 27, 1944, Serial No. 546,884

16 Claims. (Cl. 177—353)

1

This invention relates to a structurally and functionally improved controlling apparatus and in its more specific aspects aims to provide a controller which will be of particular utility when employed for the purposes of governing the flow of current through various electrical circuits embodied in apparatus such as is employed for the dissemination of information.

It is a primary object of the invention to provide an apparatus which may be employed in substitution for relatively expensive and complicated apparatus including one or a series of units; the controller of the present invention serving to perform by the operation of its mechanism the various functions inherent to the involved and expensive apparatus heretofore used for this purpose.

An additional object is that of designing a relatively simple and inexpensive controller which will embody comparatively few and simple parts, these parts being ruggedly constructed and capable of assemblage to furnish a compact mechanism operating over long periods of time with freedom from difficulties.

Further, by means of a mechanism constructed in accordance with the present teachings, a controller is furnished which will provide an apparatus serving to convert the Baudot five-unit code (or any other desirable transmitting factors) into a closing or opening of circuit contacts. Thus, permutations of circuits may be set up such that desired letters, numerals, symbols, etc., may be displayed by including in such circuits—or circuits controlled by the same—elements such as lamps or other energizable or visible units.

Still another object is that of furnishing an improved controller incorporating a structure by means of which signal storage of any desired time value may be achieved. In other words, the time interval between each cycle of operation of the apparatus is such that the circuit contacts are held or locked to maintain desired circuits in energized condition for desired periods of time. Thereafter, during completion of the cycle—and when signal storage is no longer needed—the contacts are released to open the circuits.

A still further object is that of furnishing an apparatus of this type and by means of which—with minimum effort—replacements and substitutions may be made so that any required circuit permutations may be achieved. Accordingly, the grouping of energizable units or apparatus dependent for operation upon the controller may be readily changed to furnish any desired indicia and such change will require only minimum time expenditures.

2

Moreover, a mechanism embodying the present invention will be of such construction that any reasonably skilled and trained service man will have no difficulty in adjusting and replacing the elements of the mechanism when servicing is necessary. Thus, a controller constructed in accordance with the present teachings will not require the attendance of a corps of highly skilled and expensive engineers for its maintenance aside from the fact that—as a consequence of its simple design and structure—the need for servicing will be reduced to a minimum.

Accordingly, not alone will it be feasible to reduce to a very material extent the initial costs of a grouping of apparatus in which the present controller is substituted for the expensive and complicated units as heretofore employed, but, also, the maintenance costs will be minimized. These results will be achieved without in any sense sacrificing the functions or controls which it is desired to embody in the complete assembly of apparatus. Rather, if anything, the ultimate result will be achieved in a more positive and dependable manner than has heretofore been thought to be practicable.

With these and other objects in mind, reference is had to the attached sheets of drawings illustrating practical embodiments of the invention, and in which:

Fig. 2 is a sectional side view thereof taken along the lines 2—2 and in the direction of the arrows as indicated in Fig. 1;

Fig. 6 is a somewhat diagrammatic perspective view showing the manner in which the switch elements are related;

Fig. 8 is a view similar to Fig. 2 but illustrating the apparatus as shown in Fig. 7;

Fig. 9 is a somewhat diagrammatic perspective view showing the manner in which the controller bars of the apparatus of Figs. 7 and 8 are connected;

Fig. 10 is a face view of one form of cyclic governor which may be associated with mechanism of the present invention to control the same;

Fig. 11 is a transverse sectional view taken along the lines 11—11 and in the direction of the arrows as viewed in Fig. 10;

Figure 1:
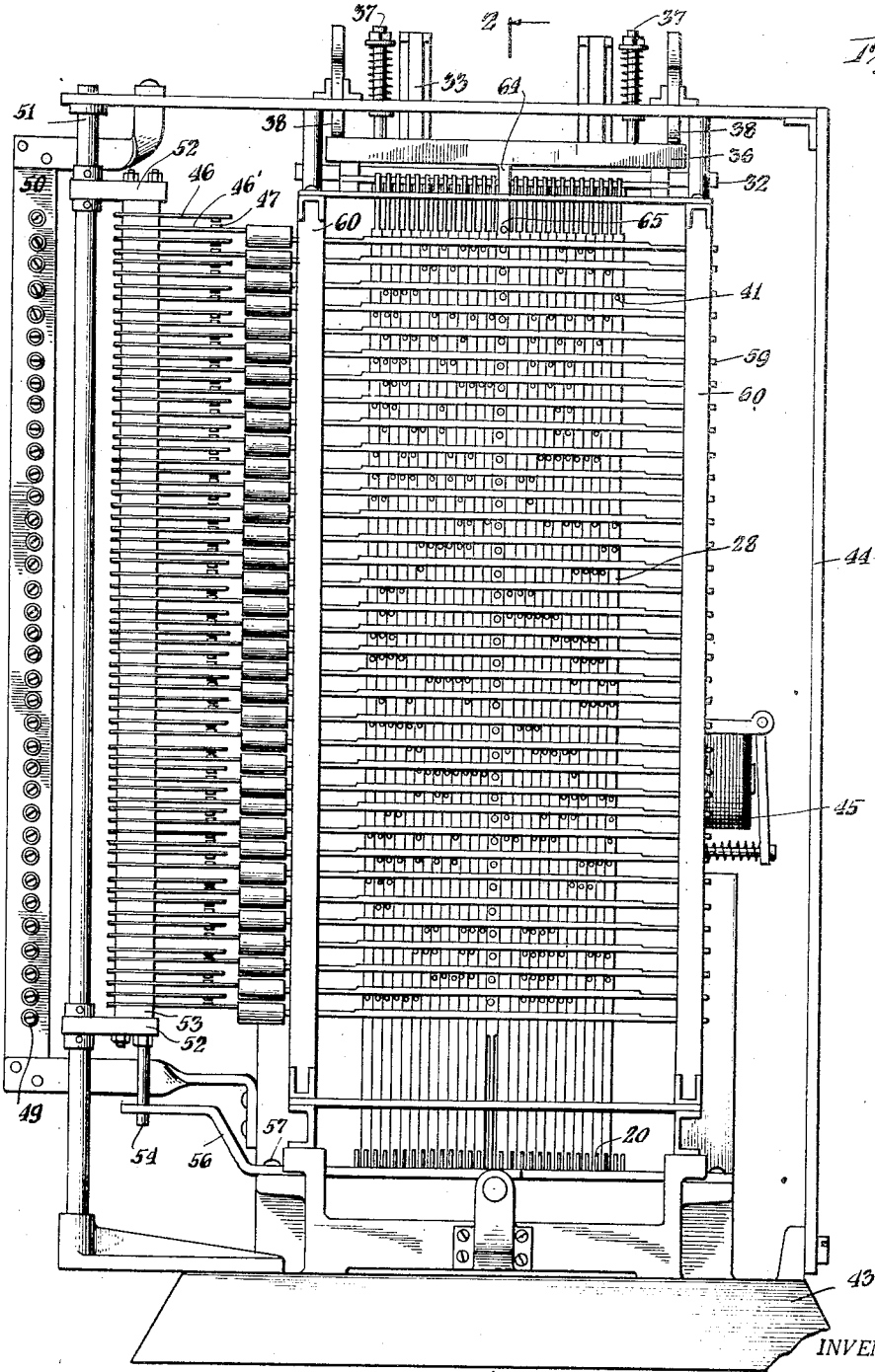
Fig. 1 is a front elevation of one form of controller.

By means of the present invention, a control apparatus is provided and which may be employed in numerous different associations. Ordinarily, it will be of particular value when embodied in a layout of apparatus for the transmission and display of information. Such apparatus may take one of numerous different forms and serve to display upon a board or sign field information provided, for example, by a desired permutation of energizable elements such as lamps. One form of such apparatus and with which the present invention may be combined is that disclosed in United States patent to Unkles et al. 2,343,594 entitled "Sign control and system" and dated March 7, 1944.

The operation of the herein traversed controller may be governed by, for example, a tape embodying the Baudot five-unit code or any other suitable structure. For the purpose of exemplifying the invention, the detailed structure hereinafter traversed will be correlated to such a code or primary control. As will readily be understood, such description is to be taken in an illustrative rather than in a limiting sense. Similarly, the controller herein described will be considered as connectable to and connected to an apparatus providing a traveling message sign, such apparatus being of the type shown in the aforementioned Unkles et al. patent. As will again be apparent, the present controller might be otherwise connected to apparatus, the operation of which is to be governed. Under certain circumstances, some slight rearrangement of parts might be necessary where it is connected to such other apparatus. Such rearrangement or modification of structure would be readily within the purview of any skilled mechanic who would visualize the demand and consequent structural requirements of the controller necessary to achieve the desired operation and functional results of the apparatus connected thereto.

Thus, assuming that a tape is employed as what might be termed a primary control and that this tape is to be perforated in accordance with the technique of the Baudot code, it will be understood that a tape perforator is used which may be either a keyboard-operated perforator or a receiving perforator for forming apertures in a tape in accordance with the message to be displayed by, for example, a traveling sign. The tape also includes perforations comprising certain control signals hereinafter referred to. Each of the message signals perforated in the tape comprises a five-unit permutation code signal. The letter signals are preceded by an unshift signal and the remaining character signals are preceded by a shift signal as is well known in the telegraph art.

Again, as is well understood by those conversant with the art, the perforated tape is associated with a transmitter. This transmitter will include a row of elements such as pins and a feeding sprocket for shifting the tape through the transmitter. The pins are projected and retracted. According to whether they are capable of complete projection incident to being aligned with one of the perforations of the tape or else are incapable of full projection because such movement is interrupted by the pin engaging the body of the tape, circuit closers controlled by the pin are operated. Such circuit closers cause electrical impulses to be transmitted and by means of which an actuating mechanism forming part of the present controller is caused to operate. Such operation will result in the opening and closing of various contacts forming parts of switches. Accordingly, any desired permutation of circuits embracing these switches will be closed and opened according to the perforations embodied in the controller tape as it passes through the transmitter.

While various forms of actuating mechanism may be employed as part of the controller, it is preferred to utilize an actuating mechanism provided with five longitudinally movable permutation bars. These bars are shifted to left-hand right-hand positions corresponding to the received character code (resulting from operation of the selector pins of the transmitter) in conjunction with the operation of a suitable selector mechanism. The permutation bars are arranged to have on certain edges thereof a series of notches with the notch in each bar being disposed differently from those in each of the other bars. For each combination of setting of the permutation bars, a notch in each of the same is in vertical alignment with a notch in each of the others. Following the setting of the permutation bars, a cyclically operated bail member is caused to function to permit a series of drop-in bars to approach the permutation bars. These drop-in bars are conveniently disposed in a vertical position and are pivoted adjacent their lower ends. Individual springs are attached to the same and tend to pivot the drop-in bars in a certain direction. As these bars are permitted to thus pivot towards the permutation bars, the one opposite the aligned row of notches in the permutation bars is permitted to pivot a greater amount than the rest of the drop-in bars which are arrested in their movements by engaging the edges of the permutation bars adjacent the notches therein.

Forms of actuating mechanism suitable for use in this connection are generally illustrated in, for example, United States patent to Kleinschmidt 1,448,750 of March 20, 1923, and Noxon et al. 2,252,232 of August 12, 1941. Obviously, in viewing these particular mechanisms, a machine having its selector bars arranged in the form of an arcuate bank might be employed. Likewise, the apparatus might be disposed in any desired plane. However, in the illustrated form of unit a straight bank of selector bars is utilized. These extend generally in a horizontal direction insofar as their lower portions are concerned. Permutation bars also extend in horizontal directions but in planes transverse to those in which the selector bars are disposed, and the drop-in bars extend vertically above the selector bars so that the latter move upwardly rather than downwardly in response to a given setting of the permutation bars. All or any of the foregoing might be changed according to the type of actuating mechanism utilized.

Figure 5:
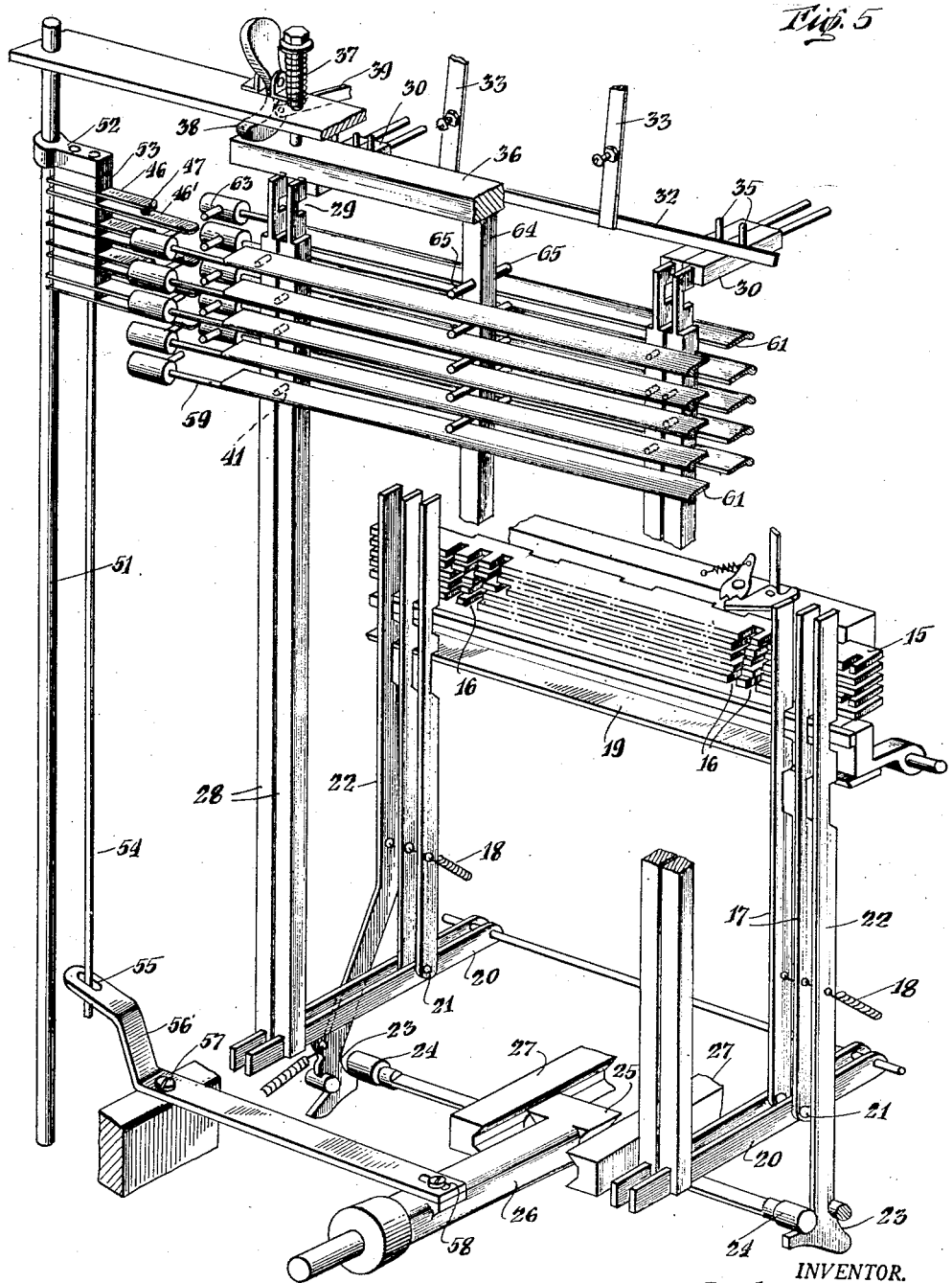
Fig. 5 is a perspective view of certain of the elements and governing mechanisms of the controller.
Figure 7:
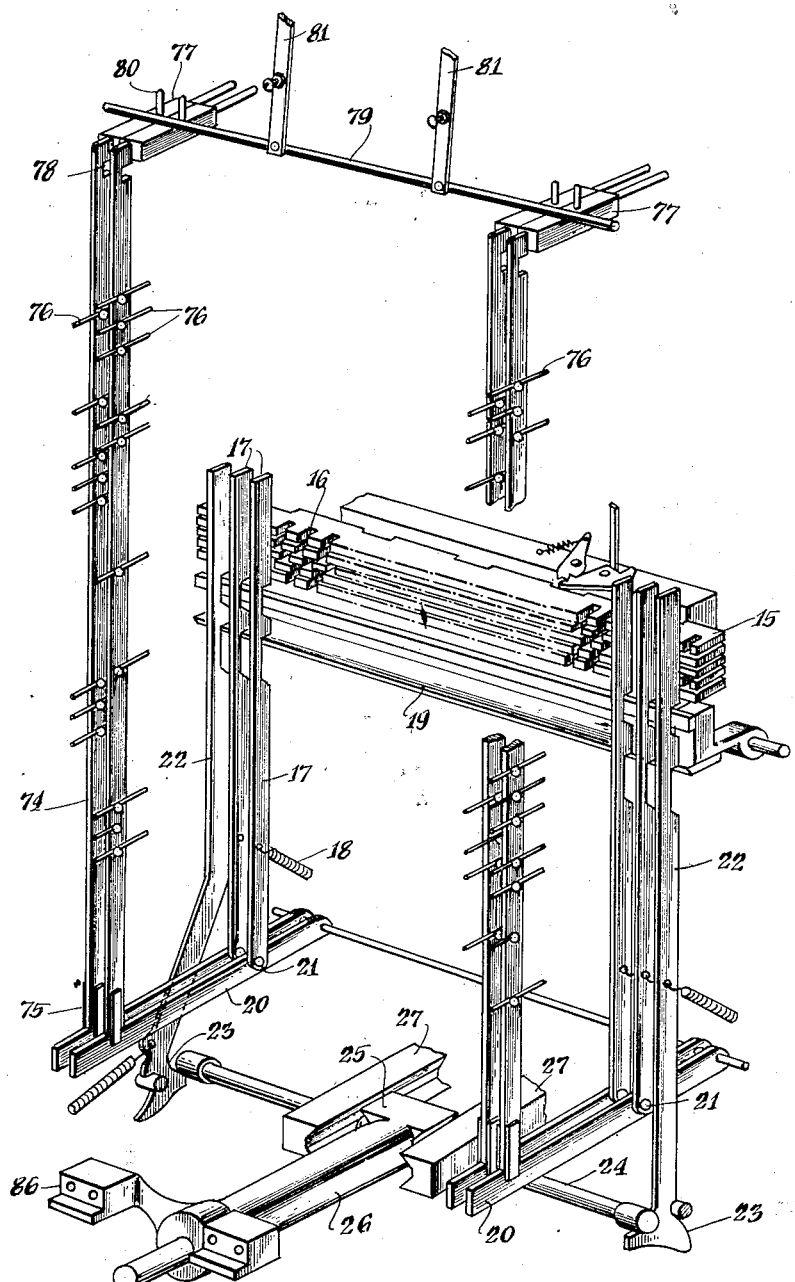
Fig. 7 is a view similar to Fig. 5 but showing an alternative form of apparatus.

First, with primary reference to Fig. 5, the numeral 15 indicates the permutation bars which are formed with notches 16. These bars are shifted laterally by means of suitable operating mechanism (not shown). Disposed adjacent the bars 15 are drop-in bars 17. These may normally be biased in given directions by means of springs 18. A bail 19 operates cyclically to raise those drop-in bars which have certain portions of their bodies disposed in the path of travel of the bail. Any drop-in bar 17 which is in registry with notches 16 aligned throughout the several bars 15 may obviously shift to a greater extent in a clockwise direction as viewed in Fig. 5 than the remainder of the bars. When so shifted, it may be engaged by the bail. The drop-in bars 17 are connected one to each of the selector bars 20; such connection being preferably achieved by the use of pivot elements 21.

The mechanism is so arranged that when a drop-in bar has passed into the groove defined by the aligned notches of all of the permutation bars 15 then the connected selector bar 20 shifts in an upward direction. As afore brought out, the parts might be disposed so that the shift occurs in a different direction. However, it is preferred that an upward shift be resorted to. Thus, the actuating mechanism is provided preferably by an assemblage of parts heretofore well recognized. In fact, such assemblage may be modified so as to be ready for use in the controller of the present invention by simply removing and discarding the type bars, the platen, and similar units shown in the aforementioned Noxon et al. and Kleinschmidt patents.

At this time it is also to be observed that adjacent the outermost of the drop-in bars 17 similar bars 22 may be disposed. These bars may also be biased in different directions by means of springs such as 18. The lower ends of bars 22 are provided with opposed cam portions 23 cooperating with followers formed in the outer end of a rod 24. The latter is secured to a bar 25 formed with an extension 26. The blocks may be supported for slidable movement between rails or guides 27. Thus, a "shift" and "unshift" mechanism is provided. This mechanism is actuated when either of the bars 22 aligns with all the adjacent notches of the permutation bars 15 and the bail 19 shifts to allow the bars 22 to enter such notches. According to whether one or the other cam portion 23 engages the followers of the rod 24, that rod will be transversely shifted. Consequently, the block 25 will be correspondingly shifted within the rails 27.

Actuating bars 28 are associated one with each of the selector bars 20. To this end, their lower ends may simply be forked and straddle the upper edges of the selector bars. When a given one of the latter shifts upwardly, it will carry with it the actuating bar 28. With a view to latching each of the actuating bars in a position to which it has been elevated, a "hold-in" or locking mechanism may be employed. Conveniently, this may take the form of a notch 29 formed in each of the bars 28 and with which notches latch elements 30 cooperate. As especially shown in Figs. 2 and 3, these latch elements may be spring-pressed as indicated at 31 in order to tend to normally enter the notches 29. In any event, it is apparent that with a latch element 30 within the notch 29 of an actuating bar, that bar will remain in elevated position until the latch is withdrawn.

With a view to achieving such withdrawal, a bail 32 may be employed. This bail lies adjacent the latch elements 30. It is supported by arms 33. The latter are shifted by magnets 34. When so shifted, the member 32 will engage the pins 35 mounted one by each of the latch elements and retract any element which is projected and extends within one of the notches 29.

Normally, the force of gravity would immediately return any bar 28 thus unlocked to its normal position and at which its forked lower end portion straddles the corresponding selector bar 20. However, to assure a substantially instantaneous return, a reset bar 36 is yieldingly supported by spring-mounted bolts 37 in line with the upper end of the actuating bars 28. Cam elements 38 may bear against the reset bar 36. These cam elements are link-connected as at 39 to the armatures or plungers of magnets 40. Therefore, when the latter are energized, the cam elements 38 will be shifted to project the reset bar 36 against the action of the springs 37. Accordingly, any actuating bar 28 which is in elevated position, will have its upper edge engaged by the reset bar and be depressed to its normal position.

If the controller is to be employed for display or imprinting the letters of the alphabet, as well as numeral symbols such as 0 to 9 and, for example a dollar ($) symbol and dash (—) mark, thirty-eight different assemblies may be embodied in the mechanism. In order to avoid unnecessary complications, it is intended to employ, for example, only twenty-six actuator bars 28. Certain of these bars are—in accordance with the teachings of the present invention—caused to perform dual functions. This is achieved by the shifting mechanism including the block 25 as hereinbefore described. As will be apparent, a greater number of the actuator bars 28 may perform such a dual function and a greater or lesser number of these bars, than twenty-six, may be utilized according to the limitations of the actuating mechanism and the purposes for which the controller is intended.

Thus, and still considering what might be termed the preferred form of the invention as illustrated in Figs. 1 to 6, pins 41 and 42 may extend from the forward and rear edges of the selector bars 28. If a given bar 28 is to perform only a single function, then pins 41 will—according to the embodiment illustrated—extend merely from the forward edge thereof. If, however, it is to perform a dual function, then pins 42 will, in addition, extend from the rear edge of the same.

The entire mechanism is preferably mounted upon a base 43. Certain supporting structures 44 may extend upwardly from the base and the latter will mount the actuating mechanism as heretofore especially identified by numerals 15 to 27 inclusive. Also, the base will mount the necessary magnets 45 or other prime movers employed to secure a proper operation of the parts. This will be in addition to the magnets 34 and 40 which are disposed adjacent the upper end of the supporting structure 44; the height of the latter being preferably adequate so that too minute a spacing of the parts will not be necessary.

With a controller of the present invention employed in conjunction with a mechanism or system such as is disclosed in the prior Unkles et al. patent, thirty-five setting head plungers will require control. Thus, thirty-five circuits must be provided. With this thought in mind and as especially shown in Fig. 1, a switch assembly is provided which includes thirty-five elements. Each of these elements may include arms 46 and 46', the latter being relatively extended. These arms may support contacts 47, normally maintained in spaced condition. As especially shown in Fig. 6, leads 48 may extend from each of the switch assemblies and terminate in binding posts or connectors 49 mounted upon a panel 50.

It is obvious that in lieu of the particular switches illustrated, many other and suitable types of circuit-closing elements might be employed. Micro-switches are entirely satisfactory and, in certain instances, mercury switches may be utilized. However, under ordinary conditions, it is preferred that the switches such as those illustrated and described be employed.

In the form of apparatus shown in Figs. 1 to 6 inclusive, this bank of switch elements is mounted so as to be shiftable as a group. A convenient form of mounting involves the use of a shaft 51 carried by the supporting structure 44 and the base 43. Swingingly supported on this shaft by means of brackets 52 is the member 53 which directly supports the switch elements.

This member is conveniently provided with an extension 54 which furnishes a pin riding within the slot 55 formed in a lever 56. The latter is pivotally supported as at 57 and, by a pin and slot connection 58, is connected to the extension 26 of the block 25. It follows that as the block is shifted within the rail 27 lever 56 will be swung. Such swinging will cause the brackets 52 to pivot around the shaft 51. Accordingly, the extended portions of the members 46' of the switch elements will (according to the position of the block 25) assume one of two extreme positions.

As especially illustrated in Figs. 1 and 2, shafts 59 are rotatably supported by side pieces 60. The actuating bars 28 extend between these shafts. Flappers or extensions 61 are secured to the shafts 59 and also extend inwardly therefrom. As will be seen, shafts 59 are arranged in two spaced rows so that, for example, a pair of these shafts lie substantially in the same horizontal plane. The spacing of these shafts is such that the extensions or flappers 61 thereof will be engaged by the pins 41 and 42 of the actuating bars 28 as the latter are shifted. In other words and as illustrated, the pins 41 and 42 underlie the extensions 61. Obviously, when an actuating bar is elevated, the pins will engage the flappers and thus rotate the corresponding shafts 59. Where, for example, only a pin 41 is involved, only the corresponding shaft 59 of a pair will be shifted. The same is true of a condition where only a single pin 42 is involved. When, however, pins 41 and 42 extend in the same plane and from opposite edges of the actuating bar, then both of a pair of shafts will be shifted.

Figure 3:
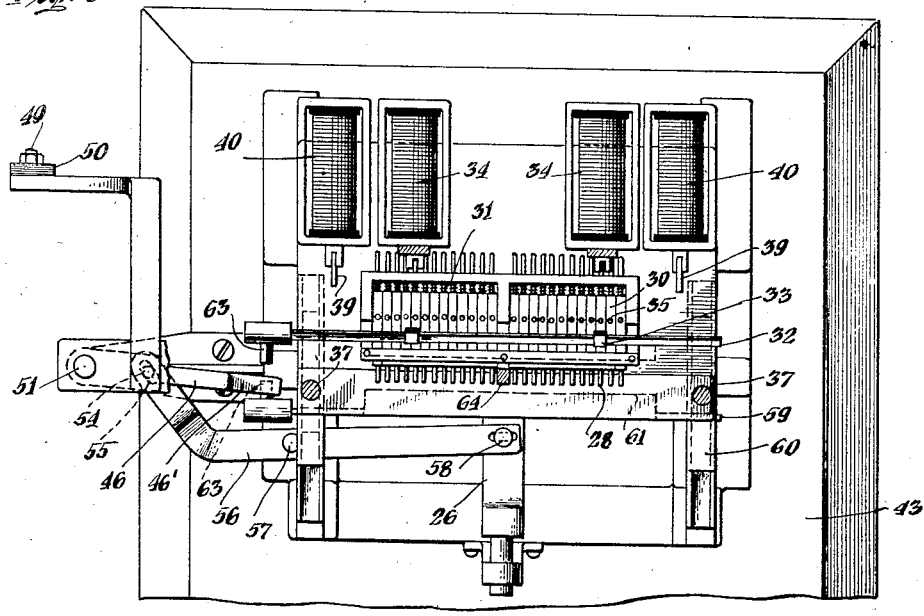
Fig. 3 is a top plan view taken below the plane of certain of the releasing mechanisms.
Figure 4:
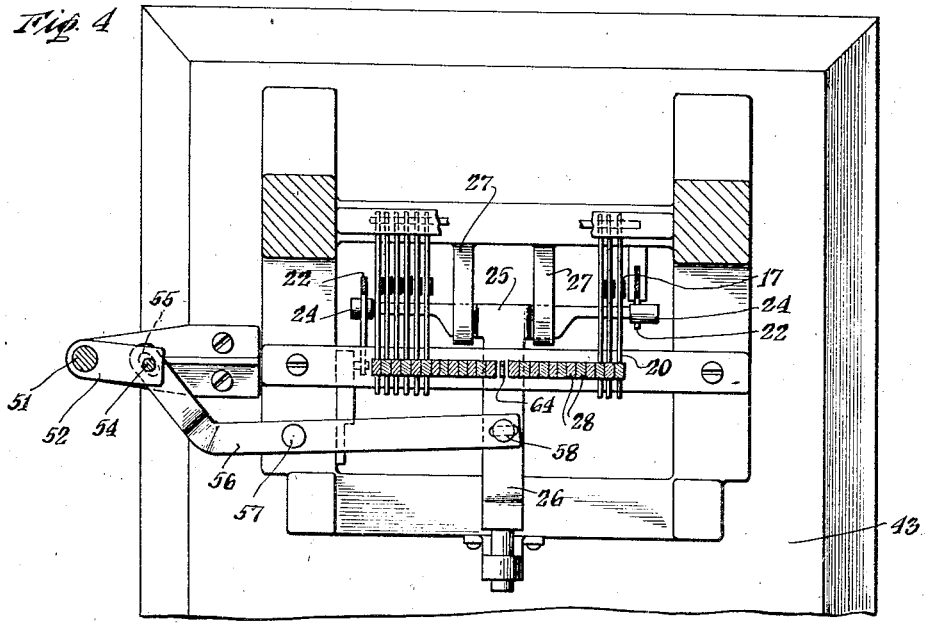
Fig. 4 is a transverse sectional view taken along the lines 4—4 and in the direction of the arrows as indicated in Fig. 2.

Again referring to Fig. 5 taken in conjunction with Fig. 3, it will be observed that each one of the shafts 59 mounts conveniently at a point beyond the side member 60 a crank portion. Such portion may be in the form of an inwardly extending pin or extension 63. The crank or similar operating portions 63 are spaced so that the operation of one of the shafts 59 does not interfere with the operation or non-operation of the second shaft of a pair. This has been clearly illustrated in Figs. 3 and 5. The switch assemblies may, however, be swung around the shaft 51 so that they will be actuated by the crank portions of either the inner or outer row of shafts 59. This will depend upon the position of the switch elements as established by the block 25 or equivalent shifting unit.

In the present layout of apparatus the left row of shafts as viewed in Fig. 2, the outer shafts 59 as viewed in Figs. 1 and 5, and the lower shafts as viewed in Fig. 3 may be considered the "letter" or "character" providing shafts. The opposite row of shafts 59 provide numerals 0 to 9 and symbol marks such as, for example, a hyphen (-) and a dollar ($) sign. Thus, twenty-six actuating bars 28 are provided and only twelve of these bars will serve a dual function; such a number being adequate to provide the numerals and two symbols. The row of pins 41 on these actuating bars will therefore provide the letters or characters while the rows of pins 42 serve to provide the numerals and symbols. According to whether the switch elements 46—46' are shifted to be engaged by the cranks 63 of one row of shafts or the other row, the switch assemblies will be closed to energize circuits providing either letters or numerals and symbols. Regardless of whether one row of cranks 63 are in operative relation to the switch elements or not, they will shift as the pins 41 and 42 engage the flappers or extensions 61 of both rows of shafts 59. However, as afore brought out, no closing of circuits will follow if the cranks 63 or their equivalents are not in operative association with the switch elements and due to the fact that such elements have been shifted from a position at which they might be engaged by the crank.

Under normal circumstances and with the release of a given actuating bar 28, the shafts 59 could, under the influence of gravity, return to their normal positions at which their extensions or flappers 61 extend horizontally as illustrated in the presently described embodiment of the invention. However, to assure such a return, it is proposed that the reset bar 36 which functions after the bars are released by the latches 30 to push the bars 28 to their lowered or normal positions, also serves to return the shafts 59 to their initial positions. A structure by means of which this result may readily be achieved is especially illustrated in Fig. 5 in which it will be noted that a further bar 64 is secured to the bar 36 to move with the same. This bar 64 is provided with extensions or pins 65 above and overlapping the flappers 61. Therefore, each time the bar 36 is lowered by actuation of the cams 38, bar 64 will also be projected downwardly. This will cause the pins 65 to engage the flappers or extensions 61, and thus rotate the shafts 59 to occupy their initial positions. In such positions the cranks 63 will be free of and preferably underlie the switch elements which they are to operate.

Attention is now directed to Figs. 10 and 11 in which a synchronizing mechanism or distributor has been somewhat diagrammatically illustrated. This may conveniently include a circular contact strip 66 around which there is concentrically disposed arcuate sections 67, 68, 69 and 70. A pair of contacts 71 and 72 may be mounted by a rotating arm 73 having its axis of rotation centrally of the arcuate segments and circular contact strip just described. This synchronizer or distributor is operated by, for example, the mechanism governed by the controller of the present invention. In this connection, attention is invited to Fig. 8 of the Unkles et al. Patent 2,343,594. Preferably, the arm 73 is rotated as a part of that final assembly rotates. The segments 67 to 70 are connected to the transmitter and to the electro-magnets 34 and 40 so as to sequentially control the feeding of the tape, the impulses transmitted by the feeler pins, and the operation of the present controller.

Primarily considering the function of the several segments, we may assume that segment 67 provides the impulse—when energized—which assures a feeding of the tape one step. Segment 68 allows the impulses resulting from the operation of the feeler pins or their equivalents and by means of which the permutation bars 15 are shifted so that the selecting bars and actuating bars may assume positions such that the flapper actuating bar is elevated. Such elevation will occur and should be maintained throughout the entire segment 69. Thereupon, and as the brushes or contacts 71 and 72 traverse segment 70, the magnets 34 and 40 are energized. Incidentally and due to proportioning of the parts, it has been found that, while simultaneous energization of these magnets may occur, physical interference of the parts will not result. More particularly, the storage latch 30 will be withdrawn from the notch 29 of any particular actuating bar 28 before the reset bar 36 engages the top edge of that bar 28. However, should difficulty be experienced, then it will be understood that segment 70 might be subdivided to assure primarily a retraction of the storage latches and only thereupon an operation of the reset bar 36.

Assuming that the present apparatus is to send impulses resulting in the word "and" followed by the word "to", it will, of course, be understood that the necessary perforations to achieve this result are embodied in the tape as fed through the transmitter. As the sector 67 of Fig. 10 is traversed, the initial row or group of perforations will pass into the transmitter, the feeler pins will function, and impulses will be transmitted such that the permutation bars 15 will have certain of their notches 16 aligned to provide a groove in line with one of the drop-in bars 17. The bail 19 functioning, this drop-in bar may swing rearwardly as viewed in Fig. 5, thus causing the attached selector bar 20 to elevate. This will occur as the sector 68 is being traversed.

Incident to the elevation of the selector bar, the corresponding actuating bar will be elevated. As afore brought out and with the switch assembly in a position where it cooperates with the cranks 63 of the outer row of shafts 59, individual switches will be closed simultaneously with the elevation of the selector bar. These switches will now remain closed for a suitable interval. This will again be because the elevated actuating bar 28 will be engaged by its storage latch 30. This condition will prevail throughout the traversal of the character or numeral storage inherent throughout the sector 69 of the cycle. As a consequence of the closing of these circuits, the letter "a" will be set up on, for example, the sign; this being achieved by the energization of the proper plungers of the setting head and consequent illumination of lights if an apparatus such as that disclosed in the Unkles et al. patent is employed. This result having been achieved, it follows that as the sector 70—or the subdivisions thereof—are traversed, the elevated actuating bar 28 will be released and return to its lowest position. Simultaneously, all shafts 59 will again assume their positions.

The foregoing cycle of operations will be repeated for the following letters "n" and "d." Thereupon, instead of immediately setting up a further letter, the following tape step or section will simply indicate that a space is to be provided. Thus, no permutation bars will be actuated and, accordingly, no operations of the mechanism will occur during the completion of that particular cycle. Only thereafter and during the next two cycles the letters "t" and "o" will be successively set up, these again being followed by a space. Now, assuming that it is desired to transmit the letter "a" followed by the numeral "3" again followed by any desired letter or group of letters. As will be understood, the first cycle of the apparatus shown in Figs. 10 and 11 or the functional equivalent thereof will simply transmit impulses to the permutation bars such that a drop-in bar and actuating bar will be shifted and which will have pins 41 thereon such that shafts 59 will be turned and switches closed to set up the desired letter. Thereafter, a space should be provided. The perforations in the tape will be such that during this cycle only a "shift" is indicated. Therefore, the permutation bars 15 will be arranged so that the notches 16 in line with one of the bars 22 will be brought into registry. Thereupon, and with the operation of the bail 19, the right-hand bar 22 as viewed in Fig. 5 will be shifted to cause the cam portion 23 thereof to engage the follower portion of rod 24 and cause block 25 to shift forwardly or outwardly. This will cause lever 56 through pin and slot connection 58 to be rotated in a clockwise direction as viewed in Figs. 3 and 4. Therefore, the rod or extension 54 of the mounting member 53 will be swung rearwardly carrying with it the entire assembly of switches. Under such circumstances, the relatively extended portions 46 of each switch will lie adjacent and be susceptible to contact by the crank portion 63 of the rearmost row of shafts 59.

These shafts functioning to provide the numerals and symbols, it follows that they will be rocked in response to having their extended portions or flappers 61 engaged by the pins 42. During this "shift" operation, a space will have been provided. Thereupon, and with the next cycle of operation, the tape will be advanced an additional step and the succeeding code signal will cause the permutation bars 15 to be shifted so that a groove is presented for the reception of a drop-in bar 17. As the latter shifts into this groove, the attached selector bar 20 will elevate to correspondingly move that actuating bar 28 which carries pins or extensions 42 such that by closing the corresponding switches, the numeral "3" will be set up. If a word is to follow the numeral, the next tape step will provide for an "unshift" movement or transfer of the switch assembly to the "letter" side of the apparatus.

As afore brought out, various types of switches might be employed in lieu of the specific switch elements heretofore described. Likewise, it is entirely feasible to associate with each of the selector or actuating bars gang switches individual to each letter, numeral, or symbol. Such a latter construction is, in most instances, not preferred for reasons of complication, expense and maintenance, as well as other factors which will readily be apparent. It has been found that switch elements individual to each of the units or elements to be energized are, in most instances, preferable. Of course, in lieu of having the actuating bars operate shafts or their equivalents and which shafts in turn cause the switches to function, these actuating bars themselves might form part of or carry circuit-controlling elements.

In this connection, attention is invited to Figs. 7, 8, 9, 12 and 13, wherein, in common with the heretofore described views, permutation bars 15 are provided and which bars present notches 16. Capable of entering grooves or slots furnished by aligning a series of these notches are drop-in bars 17 with which springs 18 may be associated. A bail member 19 may be furnished to periodically permit the operative shifting of any drop-in bar which is in registry with a channel or groove formed by a permutation of the notches 16. Selector bars 20 may be pivotally coupled as at 21 to the drop-in bars. Moreover, the ends of the bank of drop-in bars may be defined by bars 22 having cam portions 23 for cooperation with the followers or ends of a rod 24. The latter is secured to a block 25 slidably mounted between rail portions 27 and provided with an extended portion 26.

Thus, it is apparent that insofar as the actuating mechanism is concerned, the structure shown in these figures may duplicate the mechanism heretofore described in connection with Figs. 1 to 6. Likewise, the functioning thereof may be identical and include a transverse shifting of the permutation bars 15 to align a row of the notch portions 16 of the latter so that—as the bail 19 permits of this—any drop-in bar which is in registry with notches thus aligned may shift in a clockwise direction as viewed in Fig. 7. This will result in the corresponding selector bar being shifted. While such shifting will obviously be in an upward direction, it is apparent that the apparatus may be disposed in any suitable plane with or without the inclusion of apparatus which may be desirable to compensate for the force of gravity acting in different directions than would be otherwise the case. Likewise, as the bars 22 are shifted, the rod 24 will be correspondingly moved to accordingly move the block 25 and the extension 26 thereof.

The actuating bars in this second form of apparatus have, however, been indicated by the reference numerals 74 and arm portions 75 may be disposed adjacent the lower ends of the same so as to straddle individual selector bars. The actuating bars 74 are relatively thin and thus spaced from each other a greater distance than the bars 28. Each of these actuating bars carries transversely extending contact elements 76. Certain of these elements may be of a dual nature (extend to both sides of the bar mounting the same) while others may extend in only a single direction. Again in this form of apparatus the forwardly extending contact elements 76 may provide letters or characters while the rearwardly extending ones provide numerals or symbols. Assuming that it is desired to allow for the twenty-six letters of the alphabet, the numerals 0 to 9, and two additional symbols, then it is preferred that twenty-six actuating bars be employed and that twelve of these be of a dual nature. As afore brought out, these factors may be varied according to the needs of a given installation and the wishes of the designing engineer.

While the contact-making elements 76 may be of numerous different forms, it is preferred that they be provided from relatively flexible and resilient wire sections so that they will readily yield or flex when subjected to a bending strain but will, at the same time, again assume their initial and straight positions upon the strain being relieved.

Similarly to the construction described in the preceding figures, the storage latches 77 are provided and which are spring-pressed to enter notches 78 of the actuating bars as the latter are elevated. Abutments or pins 80 may be associated with each latch and engaged by a retracting rod or element 79 common to all of the latches. Armatures 81 may be associated with electro-magnets 82. Accordingly, and with these armatures attached to the rod 79, it follows that with the magnets energized the rod 79 will be swept rearwardly to retract any individual latch element which is projected. Thus, this latch element will be released from operative association with a given actuating bar 74 and the latter may return to its normal position. In such position, the lower end of the actuating bar will rest against the adjacent selector bar which, of course, has returned to its lowered position prior to the release of the actuating bar by the energization of the magnet 82.

In order to provide the second block of switch elements for cooperation with the elements 76, a pair of side members (one of which has been shown at 83 in Fig. 8), are connected, as for example by cross pieces, to provide what might be termed a carriage. The latter is slidably mounted upon rails 84. A connecting bracket 85 is attached to this carriage and secured to a cross member 86 conveniently attached to the extension 26 of the block 25. It follows that when a "shift" operation occurs the carriage will be reciprocated within the guideways or rails 84.

Figure 12:
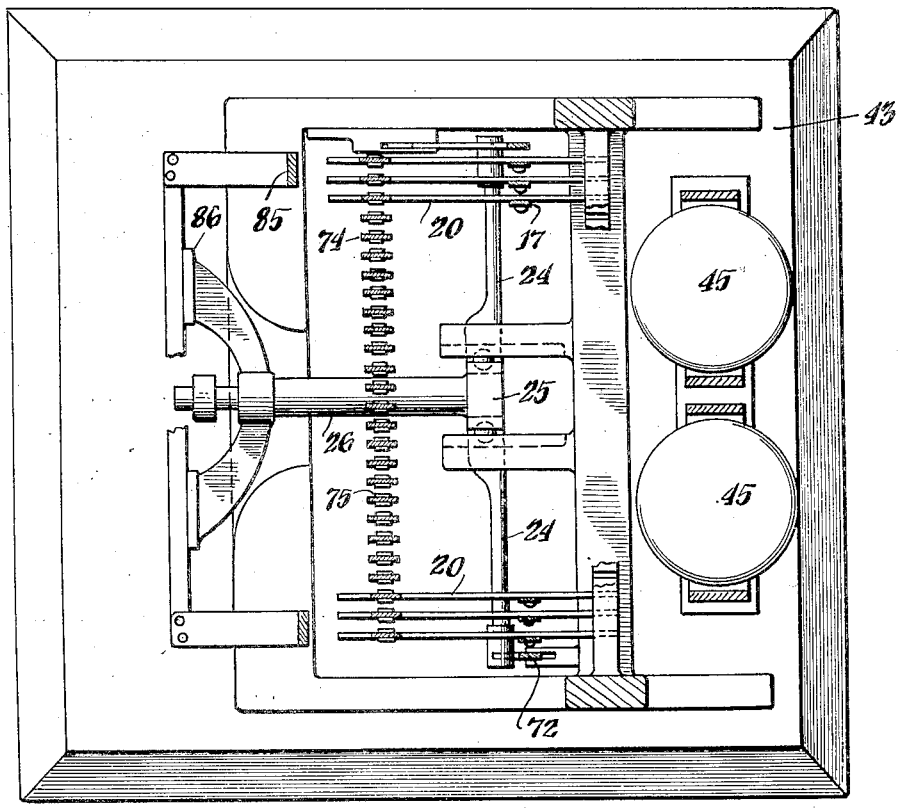
Fig. 12 is a horizontal section taken through Fig. 8.
Figure 13:
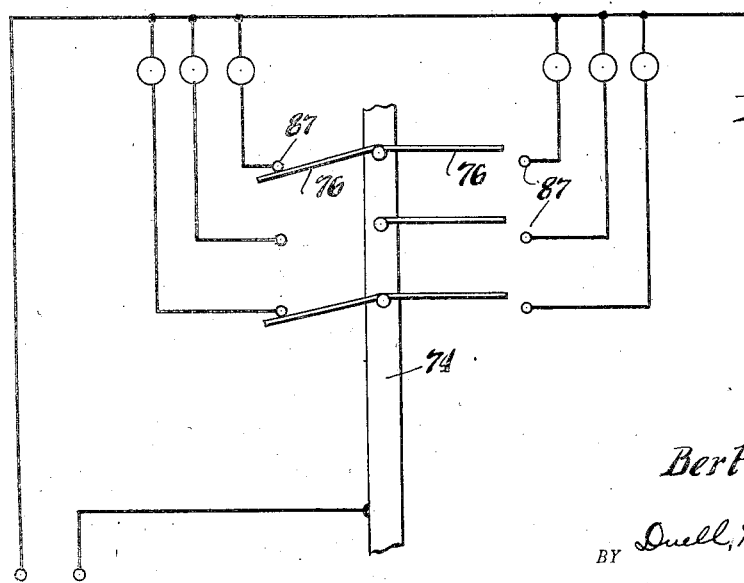
Fig. 13 illustrates schematically the circuit involved in the apparatus as shown in Figs. 7, 8, 9 and 12.

Considering this figure in conjunction with Figures 9 and 12, switch elements 87 in the form of pairs of spaced rods extend between and are mounted by the side members 83 of the carriage. These side members should be formed of dielectric material. The rods 87 may be conveniently substantially rigid. The distance between each pair of the same should be in excess of the distance between the ends of a switch element 76 extending to both sides of its actuating bar 74. Thus, it follows that with the carriage shifted to one extreme position, the wires or switch elements 76 extending beyond one edge of an actuating bar will intervene the spaces between, for example, the forward row of rods 87. When the carriage is shifted to the opposite extreme position these wires or elements will be withdrawn from these spaces and so that they clear the forward row of rods 87. However, the rearwardly extending wires or elements will now intervene the spaces between the rearmost row of rods 87.

The rods of each pair may be connected to a common terminal 88 by means of a lead 89. Thus, regardless of which one of a pair of rods 87 is contacted by a wire 76, current will flow through the lead 88. The latter may conveniently extend to a terminal panel as especially shown in Fig. 1. Thus, to provide a letter the forwardly extending wire portions 76 are employed while, to form a numeral or symbol—in the example here under consideration—the rearwardly extending wires 76 are employed. In each instance, the closing of the proper circuit will depend upon the position to which the carriage carrying the rods 87 has been shifted.

It is believed to be unnecessary to review in detail the operation of the apparatus shown in Figs. 7, 8, 9, 12 and 13 in that such operation follows substantially the same cycle as has heretofore been described. Suffice it to say that in common with the preceding structure, the actuating bars 74 are individually shifted and when so shifted are maintained in position an adequate length of time to provide a storage interval. In the interim, the selector bars may return to their initial positions. The actuating bars will similarly return upon the release of the storage latches and after a sufficient interval of time has elapsed. As the actuating bars 74 are elevated, it is obvious that the wires or switch elements 76 on a given bar will not all simultaneously engage the rods 87 with which they are to cooperate. Considerable latitude is permissible in this connection because of the resilient nature of the elements 76. In other words, one of the same may engage a given rod 87 but the elevation of the actuating bar 74 may continue to assure a firm contact of all elements 76 and their adjacent rods 87. This will merely result in a greater or lesser flexing of each individual element 76 which engages a rod and, in fact, will assist a return of the actuating bar to its normal position when it is once released from the storage latch which has engaged it. Of course, if a reset structure such as has been shown in Figs. 1 to 6 is desired, it may obviously be employed.

In order to illustrate the means by which each single actuating member can be used for the dual purpose of representing both a numeral and a character, it is necessary to picture a single field or character zone of a sign. This field will, according to the embodiment illustrated in the Unkles et al. patent, be composed of thirty-five energizable units spaced five units wide in a horizontal row by seven units high in a vertical row. These energizable units or lamps in the case of a sign, could be numbered from 1 to 35, numbering the top row 1 to 5, the next row 6 to 10, down through seven horizontal rows. In order to form the letter "T," lamps numbered 1, 2, 3, 4, 5, 8, 13, 18, 23, 28, and 33 would be energized.

In the Baudot code, the letter "T" is characterized in the lower case with the same symbol as the figure "5" in the upper case and, therefore, the actuating member would operate for either the letter "T" or the figure "5". We have, therefore, contrived to produce the letter "T" on one side of the actuating member by projections or pins 1, 2, 3, 4, 5, 8, 13, 18, 23, 28, and 33 from the left side of the actuating member. To produce the figure "5" on the same actuating member, we project pins 1, 2, 3, 4, 5, 6, 11, 16, 17, 18, 19, 25, 26, 30, 32, 33, and 34. This would produce the figure "5" on the energizable units of the sign field. When the control mechanism is in the lower case portion, the raising of the actuating member will energize the switches on the character side and produce the letter "T." When the controlling mechanism is in the upper case portion, the raising of the actuating member will energize the switches on the numeral side and produce the figure "5." The manner in which this shift is accomplished has previously been described.

Thus, among others, the several objects of the invention as specifically aforenoted are achieved. It is apparent that numerous changes in construction and rearrangements of the parts might be resorted to without departing from the spirit of the invention as defined by the claims.

I claim:

1. In combination a plurality of members movable responsive to a motive force, a plurality of groups of switch elements, means for individually connecting each of said groups with one of said members, whereby upon movement of a given one of said members occurring, the switch elements of a group will be actuated, and means independent of said member for maintaining such actuation for a predetermined and substantially constant time interval.

2. In combination a plurality of members movable responsive to a motive force, a plurality of groups of switch elements, means for individually connecting each of said groups with one of said members, whereby upon movement of a given one of said members occurring, the switch elements of a group will be actuated, means independent of said member for maintaining such actuation for a predetermined and substantially constant time interval; and the connecting means between said groups and members providing for relative movement thereof whereby during said time interval said given member may be again moved without affecting the continued actuation of said switch element group.

3. In combination a plurality of members movable responsive to a motive force, a plurality of groups of switch elements, said groups embracing combinations of elements differing from each other and individual to a predetermined combination of circuits to be established, means for individually connecting each of said groups with one of said members, whereby upon movement of a given one of said members occurring, the switch elements of a group will be actuated, means for maintaining such actuation for a predetermined time interval; and the connecting means between said groups and members providing for relative movement thereof whereby during said time interval said given member may be again moved without affecting the continued actuation of said switch element group.

4. A controller including in combination a plurality of bars, means for movably supporting the same, groups of projections associated one with each of said bars, each of said groups involving a permutation different from that of an adjacent group, two rows of switch-operating elements disposed on opposite sides of said bars and engageable by the projections thereof, a single group of switches shiftable as a unit to either of two positions, and means for shifting said group to optionally cause the same to be operated by one or the other row of elements.

5. A controller including in combination movable permutation bars, selector bars, means for moving one of said selector bars subsequently to the movements of said permutation bars, actuating units connected to be longitudinally shifted by said selector bars, projections and members engaged thereby to effect the control of circuits individual to a projection and member, said projections being disposed in groups, each comprising a multiplicity of projections, the projections in each group providing a different permutation and being of a number less than the total of said members, one each of said groups being connected to each of said actuating units, and said members being disposed in a single group common to the projections of all groups.

6. A controller including in combination movable permutation bars, selector bars, means for moving one of said selector bars subsequently to the movements of said permutation bars, actuating units connected to be longitudinally shifted by said selector bars, projections, each adapted to effect the control of an individual circuit, said projections being disposed in groups, each comprising a multiplicity of projections, the projections in each group providing a different permutation, one each of said groups being connected to each of said actuating units and extending in one direction, certain of said units mounting a second of said groups extending in a different direction, and spaced switch operating means to be engaged and operated by the projections of different groups on one of said actuating units.

7. A controller including in combination movable permutation bars, selector bars, means for moving one of said selector bars subsequently to the movements of said permutation bars, actuating units connected to be longitudinally shifted by said selector bars, projections, each adapted to effect the control of an individual circuit, said projections being disposed in groups, each comprising a multiplicity of projections, the projections in each group providing a different permutation, one each of said groups being connected to each of said actuating units and extending in one direction, certain of said units mounting a second of said groups extending in a different direction, and two groups of circuit-controlling members common to the projections of one or the other of all groups mounted by all of said units.

8. A controller including in combination a plurality of longitudinally movable actuating units, projections and members engaged thereby to effect the control of circuits individual to a projection and member, said projections being disposed in groups, each comprising a multiplicity of said projections, the projections in each group providing a different permutation, one each of said groups being connected to each of said actuating units, and said members being disposed in a single assembly common to the projections of all groups.

9. A controller including in combination a plurality of longitudinally movable actuating units, projections, each adapted to effect the control only of an individual circuit, said projections being disposed in groups, each comprising a multiplicity of projections, the projections in each group providing a different permutation, one each of said groups being connected to each of said actuating units and extending in one direction, and certain of said units mounting a second of said group extending in a different direction.

10. A controller including in combination a plurality of longitudinally movable actuating units, projections, each adapted to effect the control of an individual circuit, said projections being disposed in groups, each comprising a multiplicity of projections, the projections in each group providing a different permutation, one each of said groups being connected to each of said actuating units and extending in one direction, certain of said units mounting a second of said groups extending in a different direction, two assemblies of circuit-controlling members common to one or the other of all projection groups mounted by all of said units, and shift means to alternately render operative one of said two assemblies of members and one or the other group of projections mounted by any given unit.

11. A controller including in combination a plurality of longitudinally movable actuating units, a multiplicity of projections arranged in different permutation groups and one of each of said groups extending from each of said units, shafts rotatably mounted adjacent said units, cranks secured to said shafts and engageable by said projections to rotate said shafts, and switches connectable to and operable responsive to such movement of said shafts.

12. A controller including in combination a plurality of longitudinally movable actuating units, a multiplicity of projections arranged in different permutation groups and one of each of said groups extending from each of said units, shafts rotatably mounted adjacent said units, cranks secured to said shafts and engageable by said projections to rotate said shafts, switches connectable to and operable responsive to a movement of said shafts, and means for assuring a restoration of said cranks and shafts to their initial positions after the movement of any unit has resulted in the projections thereof engaging and shifting the cranks of the shafts.

13. A controller including in combination two rows of rotatably mounted spaced shafts, a plurality of actuating units interposed between said rows of shafts, a multiplicity of projections disposed in different permutation groups, crank extensions forming a part of said shafts and engageable by said projections, each of said actuating units mounting at least one group of projections, said group extending towards and cooperating with the crank extensions of one row of shafts, certain of said actuating units mounting a second projection group extending towards and cooperating with the crank extensions of the second row of shafts, and a group of switches connectable with and operable by said shafts.

14. A controller including in combination two rows of rotatably mounted spaced shafts, a plurality of actuating units interposed between said rows of shafts, a multiplicity of projections disposed in different permutation groups, crank extensions forming a part of said shafts and engageable by said projections, a group of switches movable as a unit to be connectable with and operable by the cranks extending from either of said rows of shafts, and means for moving said switches.

15. A controller including in combination a plurality of movable actuating units, groups of flexible contact elements secured one to each of said units and extending therefrom, said groups embracing different permutations of elements, and a row of contact members disposed adjacent and common to all of said actuating units whereby, when one of the latter is moved, selected members of said row will be engaged by the individual elements mounted by said actuating unit.

16. A controller including in combination a plurality of movable actuating units, groups of flexible contact elements secured one to each of said units and extending therefrom, said groups embracing different permutations of elements, certain of said units each mounting a second group of elements extending in a direction opposite from that in which a first group extends, a carriage, two spaced rows of contact members mounted by said carriage and extending on opposite sides of and common to all of said units and the elements mounted thereon, and means for shifting said carriage whereby one or the other of said rows of members may be disposed in operative relationship to one or another group of elements carried by an individual actuating unit.

BERT W. ROTH.

REFERENCES CITED

The following references are of record in the file of this patent:

UNITED STATES PATENTS

| Number | Name | Date |
|---|---|---|
| Re. 20,462 | Kleinschmidt | Aug. 3, 1937 |
| 1,973,539 | Morton | Sept. 11, 1934 |
| 1,991,984 | O'Neill | Feb. 19, 1935 |
| 2,063,830 | Rouse | Dec. 8, 1936 |
| 2,087,674 | Nelson | July 20, 1937 |
| 2,183,022 | Krum | Dec. 12, 1939 |
| 2,255,201 | Wheelock | Sept. 9, 1941 |
| 2,267,936 | Marrison | Dec. 30, 1941 |